(No Model.) 2 Sheets—Sheet 2.
J. F. CUNNINGHAM, Sr.
Machine for Picking and Separating Cotton.
No. 242,189. Patented May 31, 1881.
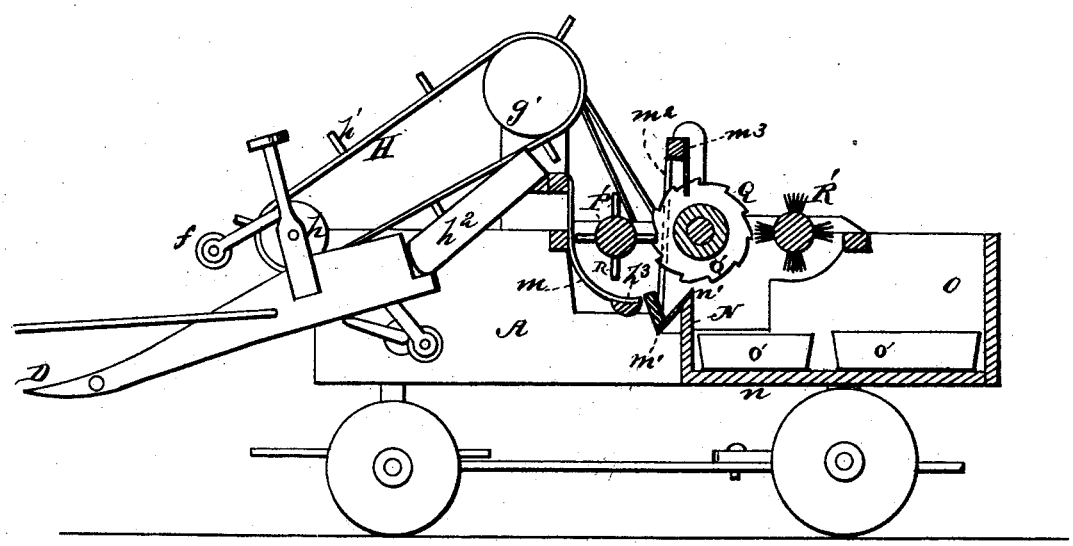
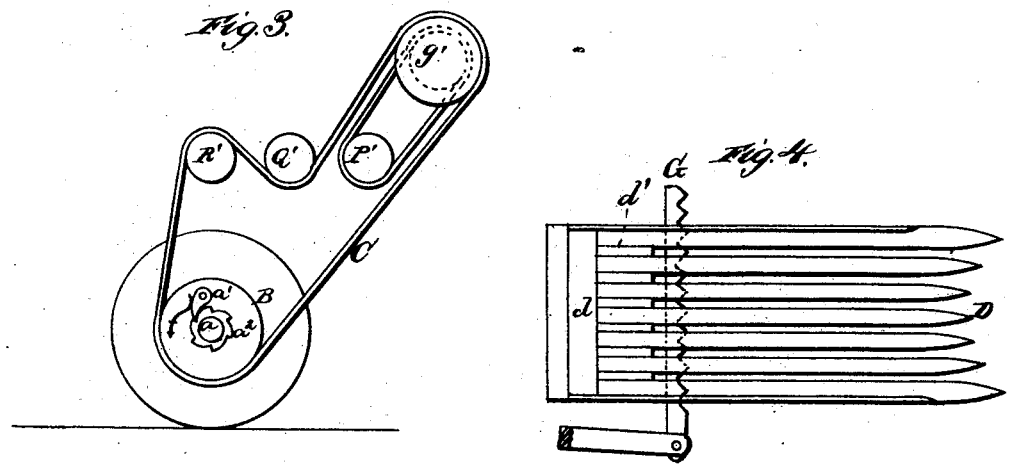
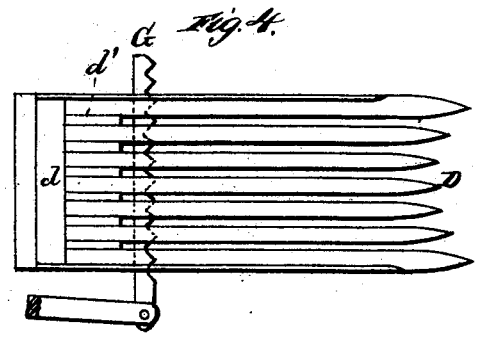
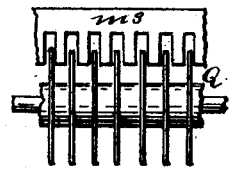
Witnesses:
Robert Everett
F. S. Burton
James F. Cunningham Sr.
Inventor
R. A. Burton
Attorney
N. PETERS, Photo-Lithographer, Washington, D. C.

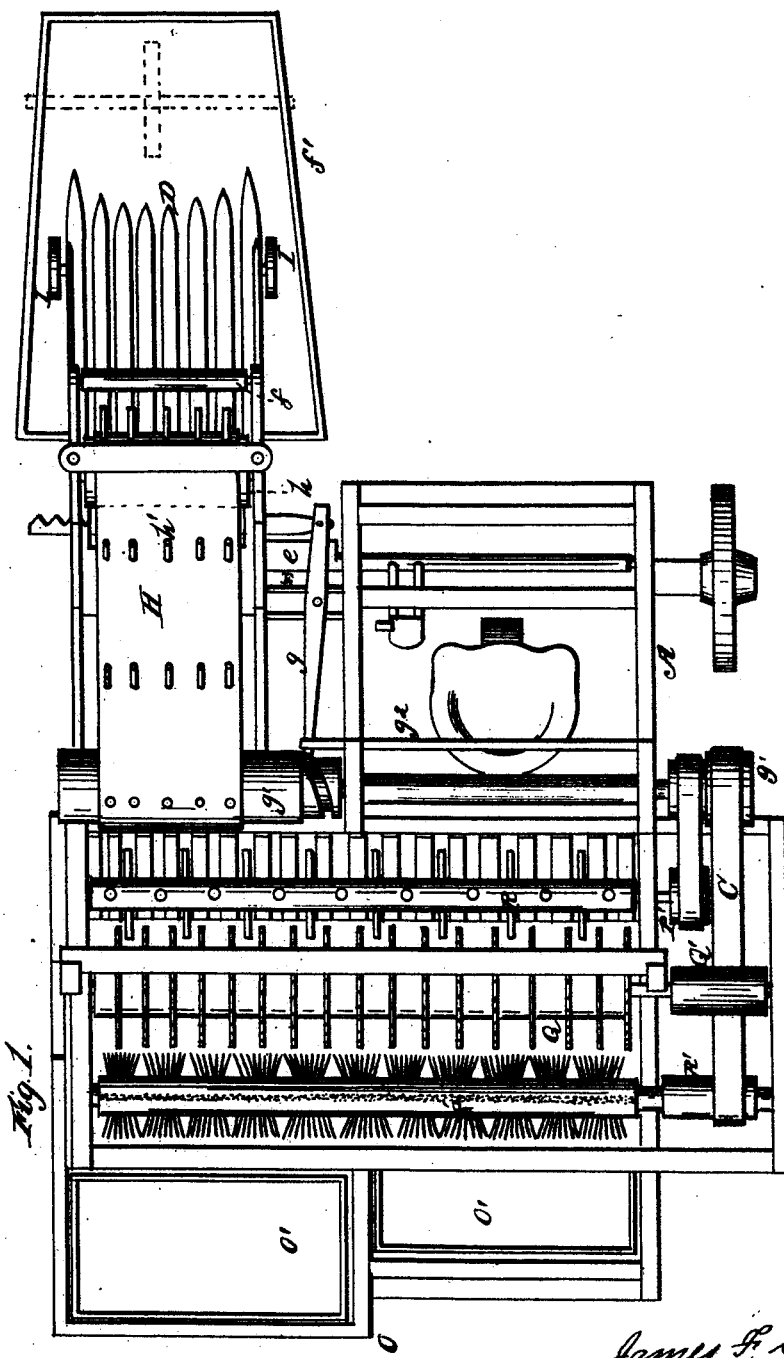

UNITED STATES PATENT OFFICE.

JAMES F. CUNNINGHAM, SR., OF SOUTH FORK TOWNSHIP, FULTON COUNTY, ARKANSAS.

MACHINE FOR PICKING AND SEPARATING COTTON.

SPECIFICATION forming part of Letters Patent No. 242,189, dated May 31, 1881.

Application filed March 11, 1880. (No model.)

*To all whom it may concern:*

Be it known that I, JAMES FRANKLIN CUNNINGHAM, Sr., of South Fork township, in the county of Fulton and State of Arkansas, have invented certain new and useful Improvements in Gathering and Separating and Cleaning Cotton by Machinery; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in cotton pickers and separators; and it consists in certain parts and details of construction hereinafter more fully described and shown. Its object is to provide a machine that will readily and rapidly gather the cotton from the stalks in the field and separate it from the bolls, fragments of stalks, and other foreign matter, and prepare it for the gin.

In the drawings, Figure 1 is a plan view of my invention. Fig. 2 is a side elevation of same, partly in section. Fig. 3 illustrates the system of driving-belts. Fig. 4 represents the picker detached. Fig. 5 is a detail view of a shaft or roller forming part of the machine, provided with a series of circular saws.

A represents the frame or body of the machine, which is supported upon traction-wheels, the rear ones of which are the drive-wheels, and are fixed to the axle.

Adjacent to one of the rear wheels is a pulley, B, fitting loosely upon the axle or shaft, so that it will rotate independently. This pulley is provided with a pawl, $a'$, which engages with a ratchet, $a^2$, rigidly fixed to the shaft or axle, whereby the pulley is made to revolve when the machine moves forward. From this pulley motion is imparted to the operative parts of the machine by means of a belt, C.

D is the picker, which consists of a series of long teeth or fingers set in a head or block, $d$, at sufficient distances apart to leave a narrow space between them. Small blocks $d'$ are inserted between the fingers, near the head, for the purpose of strengthening or stiffening the teeth, and for maintaining a proper distance between them. The points of these teeth are sharpened, so that they will readily pass between the stalks of a cotton-row. The outer teeth are also made longer than the intermediate ones, in order to catch any loose cotton that may be shaken out of the bolls. This picker is pivoted to the side of the front end of frame A by a rod, E, passing through its rear end and through the frame, so that its front or outer end may be raised or lowered. The object of placing this picker at the side of the frame is, that the wheels may travel at the side of the row when the picker is in line with it.

I I represent small wheels journaled to the outer fingers of the picker, near their front ends, to prevent the fingers being forced into the ground when the machine is moved forward, and to maintain the front end of the picker at the required height. A support, $e$, which extends out from the frame A, also assists in supporting the rear end of the picker.

G is a sickle extending across beneath the picker-fingers, near the rear end, having a reciprocal motion when the machine is operated, and is designed to sever the branches and weeds as they are reached.

H is a wide endless belt, located above the picker and running over drums or wide pulleys, $h$ and $g'$, the first of which is journaled in standards fixed to the sides of the picker, near its rear end, and the other upon the end of a shaft journaled in standards projecting vertically from frame A. Upon the face of this belt, at regular intervals, are rows of projecting pins or studs $h'$, which are designed to take up the bolls and remove them from the picker.

$g$ is a lever pivoted in the center to a projecting bar from the side of frame A. The outer end of this lever is pivoted to the end of the sickle-bar G, and its opposite or inner end fits into a cam-groove upon the shaft at the inner end of the drum $g'$, and is held in place by a bar, $g^2$, projecting from frame A. By means of this cam a reciprocating motion is given to the lever $g$ and communicated to the sickle.

$f'$ is a light frame, nearly rectangular in form, its widest end pivoted to the picker D and its narrower end extending beyond it in front, when it occupies a horizontal position. This frame is capable of being raised or lowered at will by means of a lever or other suitable device arranged within the reach of the driver, and is designed to lift such stalks as may have become prostrated to an upright position, so that they can be operated on by the picker. A light wheel (shown by dotted lines) supports its outer end.

$f$ is a small roller journaled slightly above the picker, in arms projecting from uprights fixed in the sides of the picker, and is designed to press or mash down any limbs or weeds that project in passing through the picker.

At the rear end of the picker, beneath belt H, is a trough, $h^2$, corresponding in width to the picker, and designed to receive the cotton bolls as they are delivered from the picker.

In rear of trough $h^2$ is the separator for separating the cotton from the bolls. It is composed of a series of curved slats, $m$, extending entirely across the machine and arranged parallel with each other, which may be placed at a slight angle, so that their opposite ends incline toward opposite sides of the machine; a transverse V-shaped trough, $m'$; a series of vertical slats, $m^2$, extending from a horizontal cross-bar, $m^3$, to the inner edge of the trough $m'$; a shaft, P', journaled within the space between the slats $m$ and $m^2$, and provided with beaters R; a saw-shaft, Q', journaled immediately in rear of the vertical slats $m^2$, and provided with a series of circular saws, Q, which project between said slats, and a brush-shaft, R', immediately in rear of the saw-shaft.

Beneath the saw-shaft, and extending across the body of the machine, is a partition, N, reaching downward from the rear edge, $n'$, of trough $m'$ to the floor. In rear of this partition are two compartments, O O, in which are placed boxes O', to collect any flying cotton from the separator.

The operation of my machine is as follows: When in position the picker will be on a line with the cotton-row and the wheels at the side of the row. As the machine moves forward the tops of the stalks containing the cotton-bolls pass between the fingers of the picker until they reach the sickle, when the stalks are severed and the bolls are seized by the projecting pins $h'$ on belt H and carried up the incline through the picker and trough $h^2$ to the separator, where they are dropped upon the curved slats $m$, when the projecting arms of the rotary shaft P' strike them and separate the cotton from the bolls, which drop between the slats to the ground, while the cotton is given an inward direction by the inclination of the slats and thrown against the vertical slats $m^2$, where it is still further separated by the projecting saws Q from dirt and fragments of limbs and bolls, the vertical slats serving to arrest such fragments of limbs as may still accompany the cotton. It then passes through between the vertical slats, the saws Q serving to facilitate its progress. When it reaches the brush-shaft R' the cotton is brushed from the saws by the rotary brushes and deposited in the boxes or receptacles O' O' in condition for the gin. The various shafts are rotated by the belt C, which passes around pulley B of the rear axle, thence over the outer end of R', and beneath the end of Q' to and around the pulley on the end of $g'$. Shaft P' is rotated by a separate band passing from it around a small pulley on $g'$.

I am aware that a picker composed of a series of fingers set in a head has been heretofore used in connection with cotton and other harvesters; also, that rotary shafts, rotary saws, and rotary brushes have been employed in connection with machinery for cleaning cotton, and I do not claim any of these, broadly; but

What I claim, and desire to secure by Letters Patent, is—

1. In a cotton-picking machine, the combination of a series of fixed fingers forming a picker, an endless carrying-belt moved by a suitable drum, and provided with projecting points, with an inclined cotton-receiving trough located directly beneath the belt, the carrying-belt and inclined trough being placed above and in rear of the picker, whereby the cotton is carried upward to the breast-trough, substantially as described.

2. In combination with the picker D, consisting of a series of fingers, as shown, the nearly rectangular frame $f'$, its rear end pivoted to the picker, whereby it may be raised or lowered, substantially as and for the purpose described.

3. The combination, in a cotton-picking machine, of the picker D, pivoted at its rear end to the side of the main frame A, and having supporting-wheels H at its outer end, whereby it will automatically adapt itself to the inequalities of the ground, the reciprocating sickle-bar G, the inclined trough $h^2$, and the belt H, having the projecting pins $h'$, and running over drums $h$ $g'$, substantially as described, and for the purpose specified.

4. In combination with a cotton-picking machine, substantially as described, the series of curved bars $m$, the V-shaped trough $m'$, the series of vertical bars $m^2$, extending downward to the inner edge of the V-shaped trough, and between which revolve a series of circular saws, and the shaft P', having the projecting arms R, and located between the series of bars $m$ $m^2$, constructed substantially as described, and for the purpose set forth.

5. In combination with cotton-picking mechanism, substantially as herein described, the series of curved bars $m$, the vertical bars $m^2$, extending downward to the inner edge of the V-shaped trough, the trough $m'$, the shaft P', having arms R, the circular-saw shaft Q', having the series of saws Q, projecting between the vertical bars, and the brush-cylinder R', provided with rows of bristles, substantially as and for the purpose specified.

6. The combination of the pulley B, having pawl $a'$, and fixed loosely upon the rear axle, and the ratchet $a^2$, with belt C, actuating the brush-cylinder $R'$, the saw-cylinder $Q'$, and the shaft $g'$, which actuates the belt carrying the shaft $P'$, and the belt H, substantially as described.

In testimony that I claim the foregoing invention I have hereunto set my hand and seal this 27th day of January, 1880.

JAMES F. CUNNINGHAM, SR. [L. S.]

Witnesses:
 WALTER P. RHEA,
 A. L. PEARSON.